R. FREUND.
SPRING DEVICE FOR CYCLES AND MOTOR CYCLES.
APPLICATION FILED JULY 12, 1912.
1,106,867.
Patented Aug. 11, 1914.
2 SHEETS—SHEET 1.
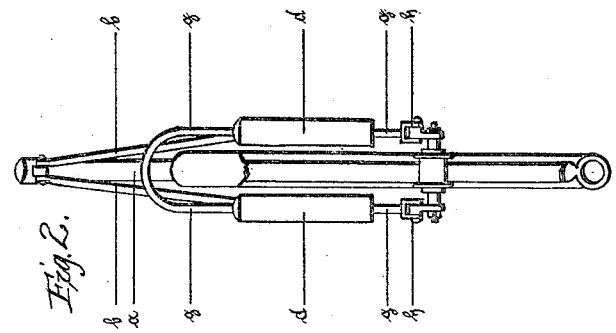
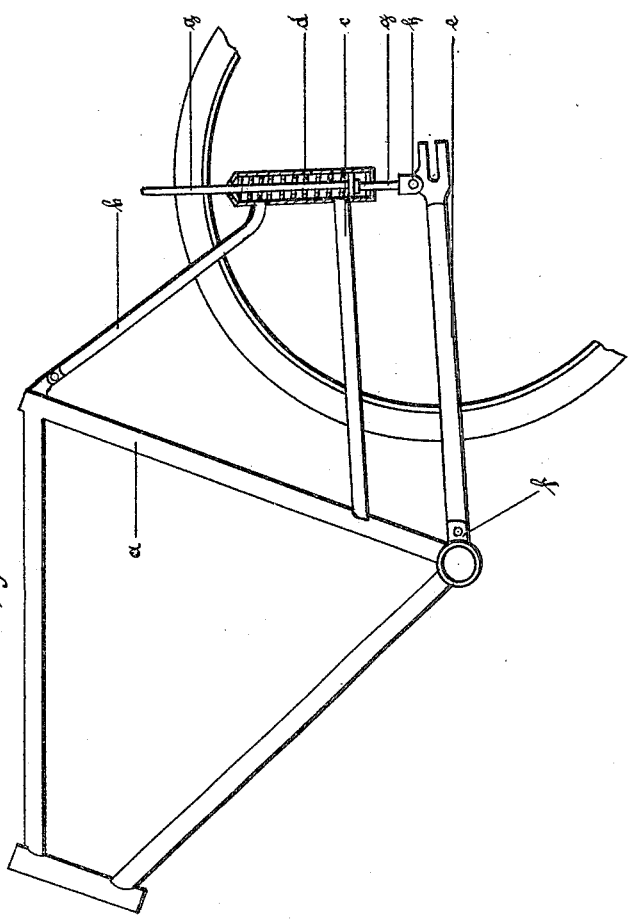
Witnesses
Stanley Wood
H. W. Blake
Inventor
Robert Freund
by
W. E. Evans
Attorney.

R. FREUND.
SPRING DEVICE FOR CYCLES AND MOTOR CYCLES.
APPLICATION FILED JULY 12, 1912.
1,106,867.
Patented Aug. 11, 1914.
2 SHEETS—SHEET 2.
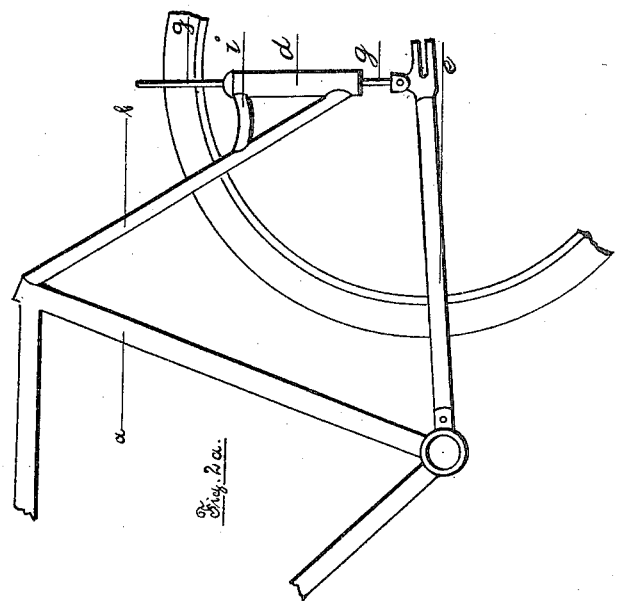
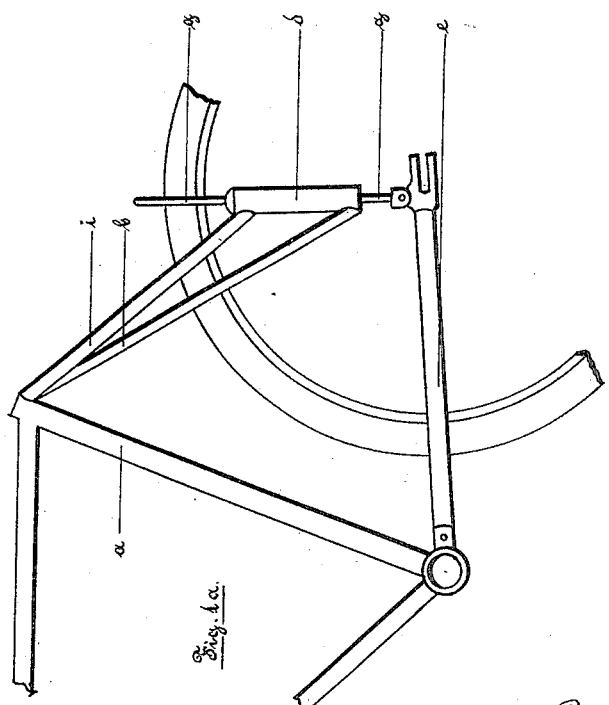

UNITED STATES PATENT OFFICE.

ROBERT FREUND, OF AUGSBURG, GERMANY.

SPRING DEVICE FOR CYCLES AND MOTOR-CYCLES.

1,106,867. Specification of Letters Patent. Patented Aug. 11, 1914.

Application filed July 12, 1912. Serial No. 709,112.

*To all whom it may concern:*

Be it known that I, ROBERT FREUND, a subject of the German Emperor, residing at Augsburg 9, Bavaria, Germany, engineer, have invented a certain new and useful Spring Device for Cycles and Motor-Cycles, of which the following is a specification.

For the purpose of absorbing shocks and vibrations in the frame when riding, this frame has been spring mounted, for example the frame consisted of two parts which were hinged together. It is also known, to provide the frame tubes as spring casings and movably to connect the rear fork to the cycle frame.

The present construction differs from those hitherto known in that according to the present case the spring casings are rigidly connected to the rear part of the frame of the cycle or motor cycle and arranged parallel to one another so that the piston rods, which are connected together at their upper ends in the form of a curve, have their lower ends hinged to the slotted ends of the rear wheel fork which is rotatable on the pedal bearing. In this manner an effective and powerful spring effect is obtained for the rear part of the frame.

In the accompanying drawings is shown the spring arrangement for the rear wheel provided according to this invention.

Figure 1 is a side elevation and Fig. 2 is a rear elevation of the new spring arrangement. Fig. 1$^a$ is a side elevation with an additional stay, and Fig. 2$^a$ is a side elevation with an auxiliary stay.

To the frame $a$ is rigidly secured a second frame consisting of the tubes $b$, $c$ and $d$ while the rear fork $e$, which usually forms a rigid connection with the frame $a$, is movable in the hinge $f$. The tubes $d$ provided on both sides of the rear wheel are provided as spring casings, in which are guided the piston rods $g$ connected to spring operated pistons within the casing. These piston rods are at their lower ends connected to the fork ends of the stay $e$ for the rear wheel, by means of hinges $h$, whereas at the upper end they are in the form of a curve and connected together in order to insure the lateral stability of the rear wheel. The spring casings, provided as tubes, can be connected to the cycle frame, without the use of the tube $c$, for example by means of the rear wheel stay $b$ itself or with the addition of additional or auxiliary stays $i$. When riding the shocks are thus absorbed as the frame $a$ yields, as it swings in the hinge $f$. These oscillations are then transmitted to the spring casings $d$ by the frame tubes $b$ and $c$ and here absorbed as the springs contained therein are alternately compressed and extended.

What I claim as my invention and desire to secure by Letters Patent is:—

A cycle frame, spring cases, frame bars rigidly connecting the spring cases to the frame, piston members slidable in the cases, the said piston members being integral and having an arch-shaped connection between them, said pistons extending below the cases, chain braces, means for pivotally connecting the pistons to the chain braces, means for pivotally connecting the chain braces to the frame, and means for yieldingly supporting the pistons with relation to the cases.

In testimony whereof I have hereunto signed my name to this specification in the presence of two subscribing witnesses.

ROBERT FREUND.

Witnesses:
 RICHARD LEMP,
 MATHILDE K. HELD.

Copies of this patent may be obtained for five cents each, by addressing the "Commissioner of Patents, Washington, D. C."